(12) United States Patent
Park et al.

(10) Patent No.: US 10,200,983 B2
(45) Date of Patent: Feb. 5, 2019

(54) METHOD AND DEVICE FOR TRANSMITTING AND RECEIVING DOWNLINK CONTROL INFORMATION

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 10 days.

(21) Appl. No.: 14/910,060

(22) PCT Filed: Oct. 22, 2014

(86) PCT No.: PCT/KR2014/009922
§ 371 (c)(1),
(2) Date: Feb. 4, 2016

(87) PCT Pub. No.: WO2015/060631
PCT Pub. Date: Apr. 30, 2015

(65) Prior Publication Data
US 2016/0183223 A1    Jun. 23, 2016

(30) Foreign Application Priority Data

Oct. 25, 2013 (KR) .................. 10-2013-0127916
Oct. 6, 2014 (KR) .................. 10-2014-0134541

(51) Int. Cl.
*H04W 72/04* (2009.01)
*H04L 5/14* (2006.01)
(Continued)

(52) U.S. Cl.
CPC ........... *H04W 72/042* (2013.01); *H04L 5/001* (2013.01); *H04L 5/0028* (2013.01);
(Continued)

(58) Field of Classification Search
CPC ... H04B 7/2612; H04B 7/2615; H04L 1/1812; H04L 1/1896; H04L 5/001; H04L 5/0023;
(Continued)

(56) References Cited

U.S. PATENT DOCUMENTS

2011/0310818 A1    12/2011 Lin et al.
2012/0009923 A1     1/2012 Chen et al.
(Continued)

FOREIGN PATENT DOCUMENTS

CN    102687453 A    9/2012
CN    105379156 A    3/2016
(Continued)

OTHER PUBLICATIONS

3GPP TS 36.212 V11.3.0 (Jun. 2013), "3rd Generation Partnership Project; Technical Specification Group Radio Access Network; Evolved Universal Terrestrial Radio Access (E-UTRA); Multiplexing and channel coding (Release 11)", Jun. 2013, pp. 1-89.
(Continued)

*Primary Examiner* — Jamal Javaid
*Assistant Examiner* — Rosene Clark
(74) *Attorney, Agent, or Firm* — IP Legal Services, LLC

(57) ABSTRACT

Provided are a method and a device for transmitting and receiving downlink control information. In particular, a method and device may be provided for configuring a downlink control information transmission format in a carrier aggregation situation among serving cells having different duplex modes. A method of a base station for transmitting downlink control information includes the steps of: configuring a downlink control information format on the basis of the duplex mode of one cell among the plurality of cells configured in a terminal performing Carrier aggregation; and transmitting the downlink control information by using the downlink control information format.

3 Claims, 14 Drawing Sheets

(51) Int. Cl.
*H04L 5/00* (2006.01)
*H04L 1/18* (2006.01)

(52) U.S. Cl.
CPC .......... *H04L 5/0053* (2013.01); *H04L 5/0091* (2013.01); *H04L 5/14* (2013.01); *H04L 1/1812* (2013.01); *H04L 1/1896* (2013.01); *H04L 5/1438* (2013.01); *H04L 5/1469* (2013.01)

(58) Field of Classification Search
CPC ... H04L 5/0028; H04L 5/0053; H04L 5/0091; H04L 5/14; H04L 5/1438; H04L 5/1469; H04L 5/0055; H04W 72/042; H04W 72/0453; H04W 72/04; H04W 72/0406; H04W 72/0446
See application file for complete search history.

(56) References Cited

U.S. PATENT DOCUMENTS

| | | |
|---|---|---|
| 2012/0039279 A1 | 2/2012 | Chen et al. |
| 2012/0039280 A1 | 2/2012 | Chen et al. |
| 2012/0044906 A1 | 2/2012 | Chen et al. |
| 2012/0207103 A1 | 8/2012 | Dai et al. |
| 2013/0163543 A1 | 6/2013 | Freda et al. |
| 2014/0036749 A1* | 2/2014 | Wang .................... H04W 28/12 370/311 |
| 2014/0293893 A1* | 10/2014 | Papasakellariou .... H04W 72/04 370/329 |
| 2014/0341167 A1 | 11/2014 | Chen et al. |
| 2014/0362811 A1 | 12/2014 | Lin et al. |
| 2015/0312934 A1 | 10/2015 | Chen et al. |
| 2016/0374082 A1* | 12/2016 | Nguyen .............. H04W 72/044 |
| 2017/0078079 A1 | 3/2017 | Papasakellariou et al. |
| 2017/0111163 A1* | 4/2017 | Yang ........................ H04L 5/14 |

FOREIGN PATENT DOCUMENTS

| | | |
|---|---|---|
| KR | 10-2012-0088819 A | 8/2012 |
| KR | 10-2012-0112686 A | 10/2012 |
| KR | 10-2013-0072240 A | 7/2013 |
| WO | 2011/157237 A1 | 12/2011 |
| WO | 2013/096928 A1 | 6/2013 |

OTHER PUBLICATIONS

3GPP TS 36.331 V10.11.0 (Sep. 2013), "3rd Generation Partnership Project; Technical Specification Group Radio Access Network; Evolved Universal Terrestrial Radio Access (E-UTRA); Radio Resource Control (RRC); Protocol specification (Release 10)", Sep. 2013, pp. 1-310.

* cited by examiner

FIG. 3

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG.8

| SIZE (SIZE) | USAGE (USAGE) | | | |
|---|---|---|---|---|
| | UPLINK GRANT (UPLINK GRANT) | | DOWNLINK ASSIGNMENT (DOWNLINK ASSIGNMENT) | POWER CONTROL (POWER CONTROL) |
| SMALL (SMALL) | - | | 1C SPECIAL PURPOSE COMPACT ASSIGNMENT (SPECIAL PURPOSE COMPACT ASSIGNMENT) | - |
| | 0 | SINGLE LAYER (SINGLE LAYER) | 1A CONTINUOUS ALLOCATIONS ONLY (CONTINUOUS ALLOCATIONS ONLY) | 3, 3A |
| | - | | 1B CODEBOOK-BASED BEAM-FORMING USING CRS (CODEBOOK-BASED BEAM-FORMING USING CRS) | - |
| | - | | 1D MULTI-USER MIMO USING CRS (MULTI-USER MIMO USING CRS) | - |
| ⋮ | 4 | SPATIAL MULTIPLEXING (SPATIAL MULTIPLEXING) | | |
| | - | | 1 FLEXIBLE ALLOCATIONS(FLEXIBLE ALLOCATIONS) | - |
| | - | | 2A OPEN-LOOP SPATIAL MULTIPLEXING USING CRS (OPEN-LOOP SPATIAL MULTIPLEXING USING CRS) | - |
| | - | | 2B DUAL-LAYER TRANSMISSION USING DM-RS (DUAL-LAYER TRANSMISSION USING DM-RS) | - |
| | - | | 2C (MULTI-LAYER TRANSMISSION USING DM-RS (MULTI-LAYER TRANSMISSION USING DM-RS) | - |
| LARGE (LARGE) | - | | 2 CLOSED-LOOP SPATIAL MULTIPLEXING USING CRS (CLOSED-LOOP SPATIAL MULTIPLEXING USING CRS) | - |

FIG.9

CROSSCARRIERSCHEDULINGCONFIG INFORMATION ELEMENTS

```
-- ASN1START

CrossCarrierSchedulingConfig-r10 ::=    SEQUENCE {
    schedulingCellInfo-r10              CHOICE {
        own-r10                             SEQUENCE {                  -- No cross carrier scheduling
            cif-Presence-r10                    BOOLEAN
        },
        other-r10                           SEQUENCE {                  -- Cross carrier scheduling
            schedulingCellId-r10                ServCellIndex-r10,
            pdsch-Start-r10                     INTEGER (1..4)
        }
    }
}

-- ASN1STOP
```

FIG.12

CROSSCARRIERSCHEDULINGCONFIG INFORMATION ELEMENTS

```
-- ASN1START

CrossCarrierSchedulingConfig-r10 ::=    SEQUENCE {
    schedulingCellInfo-r10    CHOICE {
        own-r10           SEQUENCE {            -- No cross carrier scheduling
            cif-Presence-r10    BOOLEAN
        },
        other-r10         SEQUENCE {            -- Cross carrier scheduling
            schedulingCellId-r10    ServCellIndex-r10,
            pdsch-Start-r10         INTEGER (1..4)
            DCIformatType           (FDD,TDD)
        }
    }
}

-- ASN1STOP
```

METHOD AND DEVICE FOR TRANSMITTING AND RECEIVING DOWNLINK CONTROL INFORMATION

CROSS REFERENCE TO RELATED APPLICATIONS

This application is a National Stage Patent Application of PCT International Patent Application No. PCT/KR2014/009922 (filed on Oct. 22, 2014) under 35 U.S.C. § 371, which claims priority to Korean Patent Application Nos. 10-2013-0127916 (filed on Oct. 25, 2013) and 10-2014-0134541 (filed on Oct. 6, 2014), the teachings of which are incorporated herein in their entireties by reference.

TECHNICAL FIELD

The present disclosure relates to a method and apparatus for transmitting and receiving downlink control information, and more particularly, to a method and apparatus for configuring a downlink control information transmission format for Carrier Aggregation (CA) among serving cells having different duplex modes.

BACKGROUND ART

Due to advance in communication systems, various wireless terminals have been introduced to consumers, such as companies and individuals. A current mobile communication system has affiliated with $3^{rd}$ generation projection partnership (3GPP), for example, Long Term Evolution (LTE), LTE-Advanced (LTE-A), and the like. Such a mobile communication system is a high speed and large capacity communication system capable of transmitting and receiving various types of data, such as image data, wireless data, and the like, beyond providing a voice service. The mobile communication system requires transmitting a large amount of data at a high transmit rate.

In order to transmit and receive a large amount of data at a high speed, Carrier Aggregation (CA) and dual connectivity have been introduced. Such carrier aggregation aggregates a plurality of frequency bands and executes transmission and reception of data for a User Equipment (UE). The dual connectivity enables transmission and reception of data through a plurality of Base Stations (BSs).

In the CA and dual connectivity schemes, a UE may communicate with a BS using component carriers or serving cells that have different duplex modes. Accordingly, it may need to define a method and apparatus for transmitting downlink control information in different duplex modes.

DETAILED DESCRIPTION OF THE INVENTION

Technical Problem

An aspect of the present disclosure is to provide a method and apparatus for transmitting downlink control information when a User Equipment (UE) executes communication using component carriers or serving cells which have different duplex modes.

Also, an aspect of the present disclosure is to provide a method and apparatus that defines a downlink control information format for component carriers or serving cells having different duplex modes when a UE transmits downlink control information.

Technical Solution

In accordance with an aspect of the present disclosure, there is provided a method for a Base Station (BS) to transmit control information, the method including: configuring a downlink control information format based on a duplex mode of one of a plurality of cells configured for a User Equipment (UE) that executes Carrier Aggregation (CA); and transmitting downlink control information using the downlink control information format.

In accordance with another aspect of the present invention, there is provided a method for a UE to receive downlink control information, the method including: configuring CA using a plurality of cells which have different duplex modes; configuring cross-carrier scheduling among the plurality of cells; and receiving downlink control information through a downlink control information format configured based on a duplex mode of one of the plurality of cells.

In accordance with another aspect of the present invention, there is provided a BS that transmits downlink control information, the BS including: a controller that configures a downlink control information format based on a duplex mode of one of the plurality of cells configured for a UE that executes CA; and a transmitting unit that transmits downlink control information using the downlink control information format.

In accordance with another aspect of the present invention, there is provided a UE that receives downlink control information, the UE including: a controller that configures CA using a plurality of cells which have different duplex modes, and configures cross-carrier scheduling among the plurality of cells; and a receiving unit that receives downlink control information through a downlink control information format configured based on a duplex mode of one of the plurality of cells.

Advantageous Effects

According to the present disclosure, there is provided a method and apparatus for transmitting downlink control information when a UE executes communication using component carriers or serving cells which have different duplex modes.

According to the present disclosure, there is provided a method and apparatus that defines a downlink control information format for component carriers or serving cells having different duplex modes when a UE transmits downlink control information.

BRIEF DESCRIPTION OF THE DRAWINGS

FIG. 3 is a diagram illustrating uplink and downlink configurations in a TDD frame structure.

FIG. 8 is a diagram illustrating downlink control information distinguished based on a transmission method and a purpose of use in accordance with at least one embodiment.

FIG. 9 is a diagram illustrating an example of an information element that transmits information associated with whether cross-carrier scheduling is configured according to at least one embodiment.

FIG. 12 is a diagram illustrating an example of an information element that designates a DCI format according to at least one embodiment.

MODE FOR CARRYING OUT THE INVENTION

Figure 1:
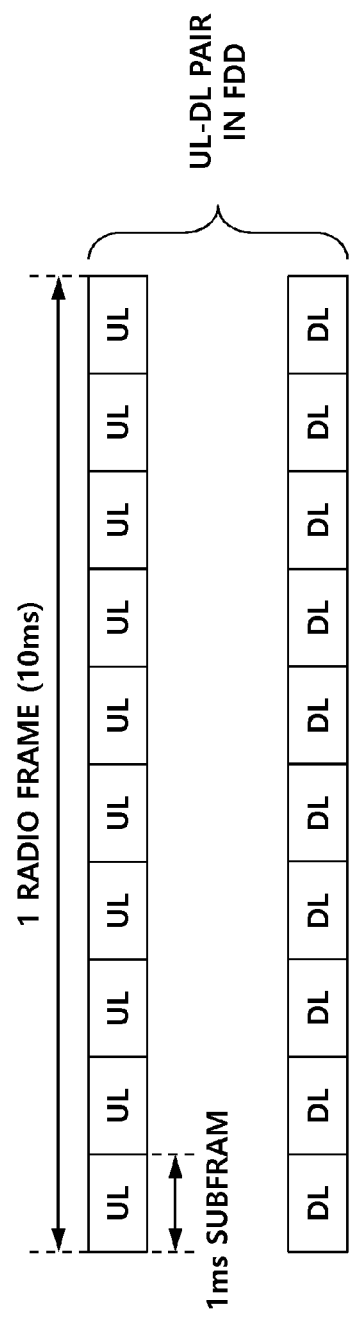
FIG. 1 is a diagram illustrating a frame structure type of an FDD duplex mode.

Hereinafter, embodiments of the present disclosure will be described with reference to the exemplary drawings. In the following description, the same elements will be designated by the same reference numerals although they are shown in different drawings. Further, in the following description of embodiments of the present disclosure, a detailed description of known functions and configurations incorporated herein will be omitted when it may make the subject matter of embodiments of the present disclosure rather unclear.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for supporting low costs (or low complexity) and/or coverage enhancement.

In other words, in the present specifications, the MTC terminal may refer to a newly defined 3$^{rd}$ generation project partnership (3GPP) Release 13 low cost (or low complexity) UE category/type, which executes Long term evolution (LTE)-based MTC related operations. Alternatively, in the present specifications, the MTC terminal may refer to a UE category/type that is defined in or before 3GPP Release 12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, a packet data service, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an mobile station (MS), a user terminal (UT), an subscriber station (SS), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an remote radio unit (RRU), and an radio unit (RU), and the like.

Each of the above mentioned various cells has a base station that controls a corresponding cell. The base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, but the present embodiments may not be limited thereto. The user equipment and the base station are used as two inclusive transceiving subjects (Uplink and Downlink) to embody the technology and technical concepts described in the specifications, but the present embodiments may not be limited thereto. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. Embodiments of the present disclosure may not be limited to a specific wireless communication field, and may include all technical fields to which the technical idea of embodiments of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), EDCCH (Enhanced Physical Downlink Control Channel, and the like, and may be configured as a data channel, such as PDSCH (Physical Downlink Shared CHannel), PUSCH (Physical Uplink Shared CHannel), and the like, so as to transmit data.

Meanwhile, Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH and may indicate a meaning including both a PDCCH and an EPDCCH.

In addition, for ease of description, a PDCCH, which corresponds to an embodiment of the present disclosure, may be applied to the part described using a PDCCH.

Further, high layer signaling as used herein includes RRC signaling for transmitting RRC information including RRC parameters.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In the 3GPP LTE/LTE-Advanced system, two types of frame structures are defined in a frequency band. Such frame structures include an uplink subframe used when a UE transmits data and control information to a BS and a downlink subframe used when a BS transmits data and control information to a UE.

FIG. 1 is a diagram illustrating a frame structure type for an FDD duplex mode.

In the frame structure type of FIG. 1, ten downlink subframes each having a length of 1 ms and ten uplink subframes each having a length of 1 ms are transmitted in different frequency bands during a radio frame interval (e.g., 10 ms). The frame structure of FIG. 1 is to support a Frequency Division Duplex (FDD) mode.

For example, the frame structure of the FDD mode may have a pair of an uplink frequency band and a downlink frequency band. A UE may transmit control information and data to a BS through the subframes of an uplink frequency band. A BS may transmit control information and data to a UE through the subframes of a downlink frequency band.

In the present specification, the frame structure based on an FDD mode and the frame structure based on a TDD mode may be referred to as an FDD frame structure mode and a TDD frame structure, respectively. Alternatively, the expression 'the frame structure is a TDD' indicates a frame structure in a TDD mode. In the same manner, the expression 'the frame structure is an FDD' indicates a frame structure in an FDD mode.

Figure 2:
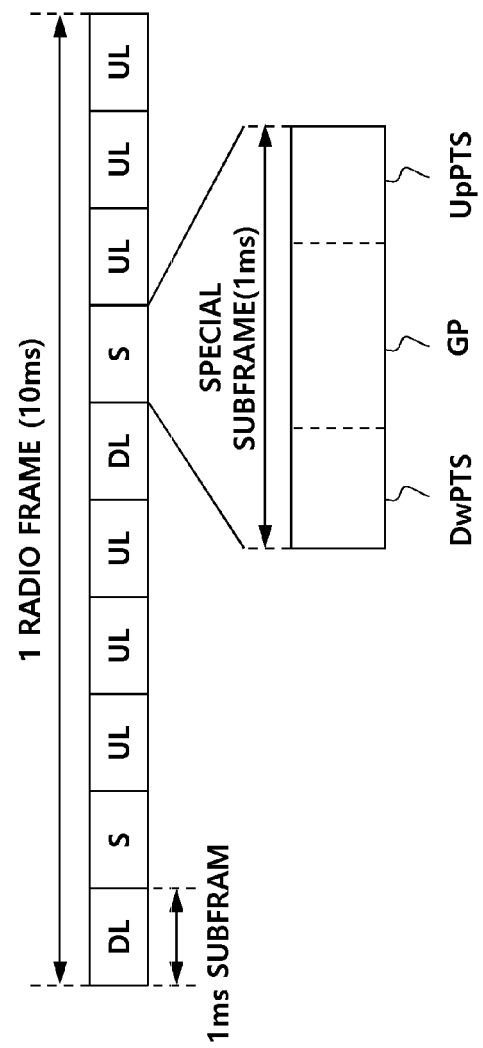
FIG. 2 is a diagram illustrating an example of a frame structure type of a TDD duplex mode.

FIG. 2 is a diagram exemplary illustrating a frame structure type for a TDD duplex mode.

Unlike FIG. 1, the frame structure type of FIG. 2 is a frame structure in which downlink subframes each having a length of about 1 ms and uplink subframes each having a length of about 1 ms during a radio frame interval of about 10 ms support a Time Division Duplex (TDD) mode that executes duplexing in the time domain, in an identical frequency band.

However, a special subframe in the TDD frame structure is a subframe to enable a UE to acquire a Guard Period (GP) for converting a downlink subframe into an uplink subframe. In the current LTE/LTE-Advanced TDD system, a total of seven TDD UL-DL configurations are supported as illustrated in FIG. 3.

FIG. 3 is a diagram illustrating uplink and downlink configurations in a TDD frame structure.

Referring to FIG. 3, seven types of Uplink (UL)-Downlink (DL) configurations (e.g., from UL-DL configuration 0 to UL-DL configuration 6) may be shown. The configurations may have a difference in the sequence of uplink subframes and downlink subframes disposed on the time-axis.

For example, in the case of the UL-DL configuration 0 of FIG. 3, subframe 0 is a downlink subframe, and subsequently, a special subframe and three uplink subframes are sequentially disposed. Subsequently, five subframes disposed in the identical sequence are repeated. As described above, in the TDD, the configurations are defined based on the disposition of subframes. D denotes a downlink subframe, U denotes an uplink subframe, and S denotes a special subframe.

Figure 4:
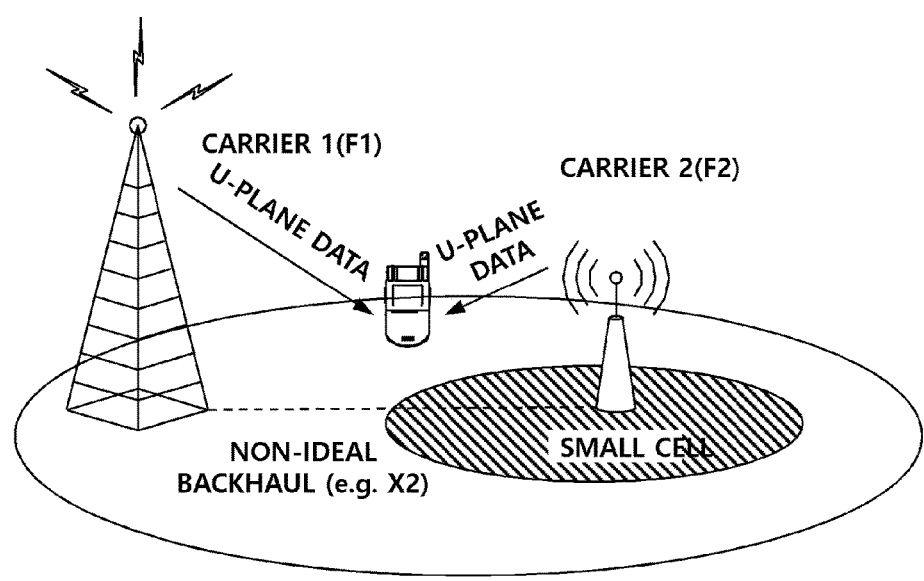
FIG. 4 is a diagram for describing an example of inter-node radio resource aggregation in accordance with at least one embodiment.

FIG. 4 is a diagram illustrating an example of inter-node radio resource aggregation to which embodiments of the present disclosure are applied.

Referring to FIG. 4, a coverage of a BS that provides a macro cell may be overlapped with a coverage of a BS that provides a small cell. In this instance, a UE may perform communication by configuring dual connectivity with the BS that provides the macro cell and the BS that provides the small cell. Also, the macro cell and the small cell may use different frequency bands and may have different duplex modes.

For example, the macro cell may use F1 frequency, and the small cell may use F2 frequency. Contrary, the macro cell may use F2 frequency and the small cell may use F1 frequency, or the macro cell and the small cell may use an identical frequency band. In the same manner, from the perspective of a duplex mode, the macro cell may use an FDD mode and the small cell may use a TDD mode, or the macro cell may use a TDD mode and the small cell may use an FDD mode. Alternatively, they may use an identical duplex mode.

According to the LTE/LTE-Advanced system standard defined in the current 3GPP, in the LTE Release-8/9 system, FDD or TDD-based data transmission and reception was possible in a single frequency band for each mobile communication provider to execute transmission and reception of data and control information between a UE and a BS.

However, in 3GPP LTE/LTE-Advanced Release-10, Carrier Aggregation (CA) was introduced as a method of increasing a data transmission rate. Such CA aggregates a plurality of frequency bands and transmits and receives data for a UE. However, the CA was supported only for frequency bands that support an identical duplex mode. That is, only the CA between FDD frequency bands is allowed for operators who support a UE in the FDD mode and only the CA between TDD frequency bands is allowed for operators who support a UE based on the TDD mode.

However, recently, as the number of LTE/LTE-Advanced service providers who secure both the FDD frequency bands and the TDD frequency bands has increased, a joint TDD-FDD operation scheme for effectively using the FDD frequency bands and the TDD frequency bands allocated in the LTE/LTE-Advanced system has drawn attention. Particularly, when an FDD+TDD CA supporting scheme based on existing CA scenarios 1 to 4 and a scheme for supporting dual connectivity between a macro cell BS and a small cell BS are supported, the necessity of the dual connectivity between an FDD cell and a TDD cell, in addition to the dual connectivity based on an identical duplex mode, has been increased.

Figure 5:
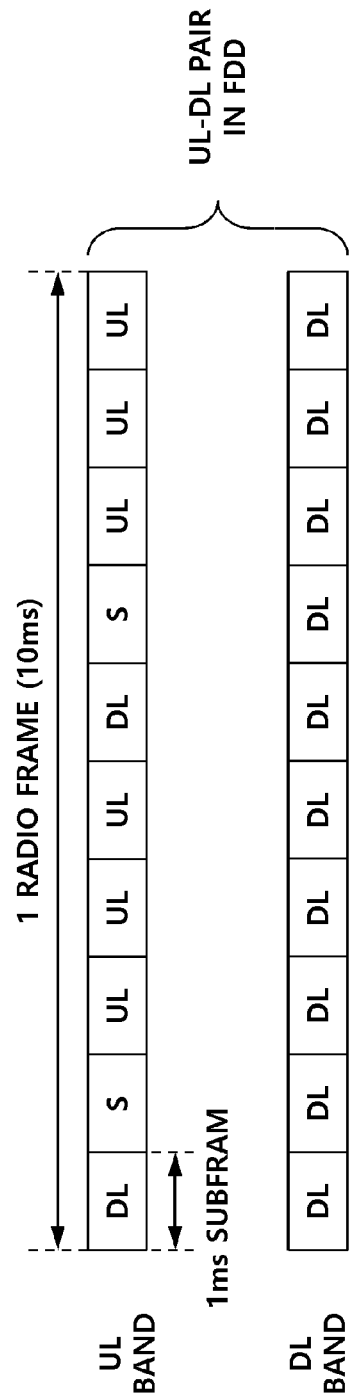
FIG. 5 is a diagram illustrating an operation of an FDD uplink band in a TDD duplex mode.

FIG. 5 is a diagram for describing operation of an FDD uplink band in a TDD duplex mode.

Referring to FIG. 5, as another scenario of the joint TDD-FDD operation, a new scenario has been introduced. Such a new scenario uses some of the subframes of a FDD uplink band for a downlink so as to solve the lack of FDD downlink (DL) channel resources and the waste of FDD uplink (UL) channel resources in a typical DL-centric traffic asymmetry environment. That is, as illustrated in FIG. 5, in order to use some of UL subframes of an UL band (frequency band) as a DL subframe for the transmission of downlink data in an FDD UL-DL pair, it is necessary to operate a corresponding FDD UL channel in a TDD mode.

As described above, in order to transmit and receive a high speed and large capacity of data, many studies have been made for developing various methods such as CA, dual connectivity, and a scenario that operates an uplink band in a TDD. In this instance, carriers or serving cells which have different duplex modes may be aggregated and operated. However, when a BS transmits downlink control information to a UE, a downlink control information format is changed based on a duplex mode of a corresponding carrier or a serving cell and thus, ambiguity may occur in the above described situation.

Embodiments of the present disclosure are for preventing such ambiguity. Hereinafter, such embodiments will be described in detail with referent to drawings.

Hereinafter, a downlink PDCCH and a Downlink Control Information (DCI) format will be described briefly.

Figure 6:
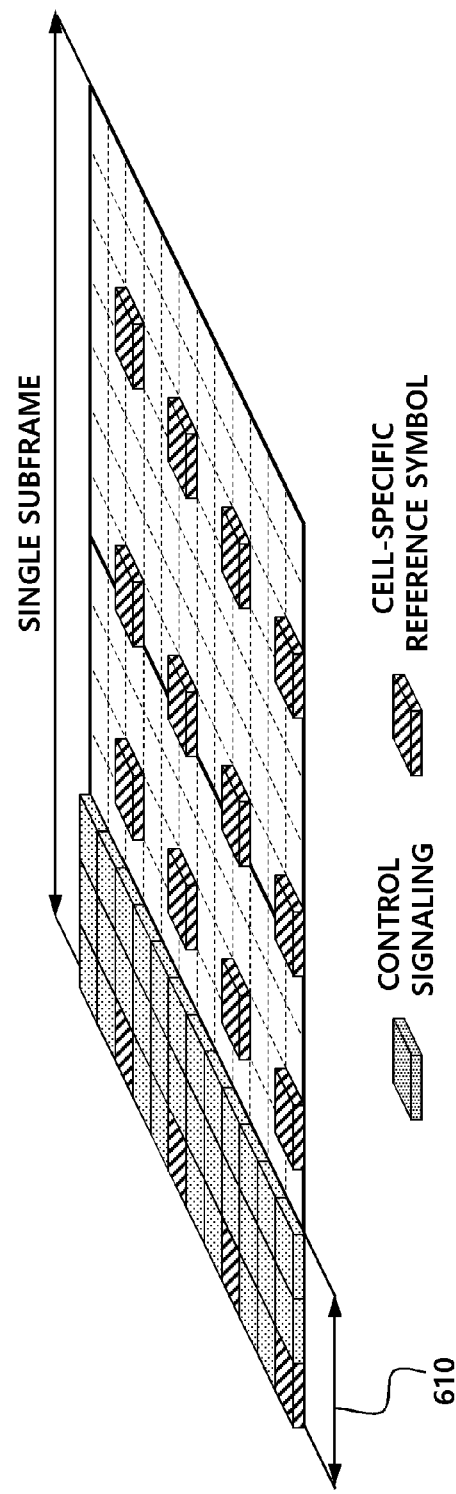
FIG. 6 is a diagram illustrating an example of control region transmission for transmitting a control channel in a single subframe.

FIG. 6 is a diagram illustrating an example of control region transmission for transmitting a control channel in a single subframe.

In FIG. 6, a corresponding control region 610 may include the transmission of a PHICH, a PCFICH, and a PDCCH. Although the control region may be formed of 1 to 3 OFDM symbols, it may not be limited thereto and may increase or decrease the number of symbols based on the condition of a system. Here, a PDCCH may be transmitted by being evenly distributed and allocated to the region remaining after excluding resources used for a PHICH and a PCFICH from the number of OFDM symbols which is indicated by the PCFICH for transmission of a PDCCH. A control signaling and a cell-specific reference symbol are distributed in a subframe.

Figure 7:
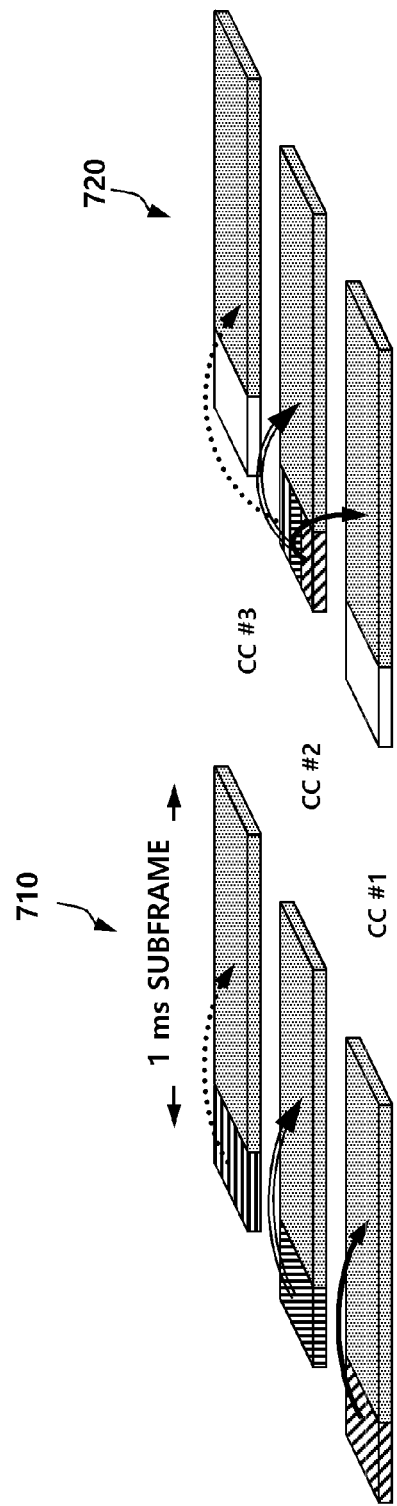
FIG. 7 is a diagram illustrating an example associated with the transmission of a PDSCH indicated by a control channel that is transmitted in each subframe when a PDSCH is transmitted on multiple carriers.

FIG. 7 is a diagram illustrating an example of transmission of a PDSCH indicated by a control channel that is transmitted in each subframe when a PDSCH is transmitted on multiple carriers.

Diagrams 710 and 720 exemplary illustrate of transmission of a PDSCH which is indicated by a control channel transmitted in each subframe when a PDSCH is transmitted on multiple carriers. CC#1, CC#2, and CC#3 of the diagrams 710 and 720 indicate a first component carrier, a second component carrier, and a third component carrier, respectively. FIG. 7 is a diagram associated with the transmission of a PDSCH indicated by a control channel transmitted in each subframe when a PDSCH is transmitted on multiple carriers. The diagram 710 shows an example of no cross-carrier scheduling in which a carrier indicator is not included in Downlink Control Information (DCI). The diagram 710 indicates self-carrier scheduling on multiple carriers, and each carrier separately has a PDCCH and independently schedules a corresponding PDSCH. Data transmission on each carrier may be executed by a control channel transmitted in each subframe within a subframe of 1 ms. The diagram 720 indicates cross-carrier scheduling on multiple carriers, and a carrier indicator is included in a DCI. This is associated with the case in which a single carrier is set to schedule a PDSCH of multiple carriers, and a PDCCH existing in a single carrier may schedule a PDSCH which may be transmitted on multiple carriers. In the same manner as the diagram 710, in the example of the diagram 720, data transmission on multiple carriers are executed by a control channel that is transmitted in each subframe within a subframe of 1 ms.

FIG. 8 is a diagram illustrating downlink control information formats distinguished based on a transmission method and a purpose of use in accordance with at least one embodiment.

FIG. 8 is a Downlink Control Information (DCI) format indicating scheduling grant for uplink/downlink transmission. DCI formats may be distinguished based on a corresponding uplink/downlink transmission method and a purpose of use and transmitted.

In this instance, in FIG. 8, although DCI formats are identical, an information field that configures a corresponding DCI format may be different based on a frame structure, that is, whether it is an FDD system or a TDD system. That is, although DCI formats are identical, an information field forming a DCI format may be different according to a duplex mode of a carrier or a serving cell. For example, a difference may occur in whether a Downlink Assignment Index (DAI) information field exists, a size of an information field for the allocation of a Hybrid-ARQ process number, or the like.

Particularly, an information field for allocating a PUSCH/PDSCH resource, which is included in each DCI format in an FDD system and a TDD system, is described in detailed in the 3GPP TS 36.212 document.

According to CA applied in the typical 3GPP LTE/LTE-Advanced system, only the CA between component carriers or service cells which operate in an identical frame structure or an identical duplex mode was applied. However, when CA between a TDD carrier and an FDD carrier is applied, a DCI format used for transmitting corresponding scheduling information may need to be defined based on the frame structure of component carriers or serving cells where data scheduling is executed. Particularly, when cross-carrier scheduling is applied, which of DCI formats from among a TDD type DCI format and an FDD type DCI format is used for transmitting downlink control information may need to be defined for each scenario.

Therefore, in accordance with embodiments of the present disclosure, a method may be provided for defining a DCI format to be used for transmitting downlink control information when CA between a TDD carrier and an FDD carrier is applied. Particularly, when cross-carrier scheduling is applied, a method may be provided for defining a DCI format to be used for transmitting scheduling information based on the frame structure of a serving cell through which scheduling DCI associated with a serving cell in accordance with embodiments of the present disclosure.

As a scheduling method for a UE for which CA is applied, a self-scheduling method may be provided. The self-scheduling method signals resource allocation information associated with a data channel such as a PDSCH, a PUSCH, or the like in a serving cell through a downlink control channel (a PDCCH or an EPDCCH) which is transmitted through a downlink subframe of the corresponding serving cell.

Also, a cross-carrier scheduling may be provided. The cross-carrier scheduling signals the radio resource allocation information associated with a data channel such as a PDSCH, a PUSCH, or the like in a serving cell through a downlink control channel of another serving cell.

Whether cross-carrier scheduling between serving cells or component carriers is configured with respect to a UE to which CA is applied may be configured, through a higher layer signaling of a BS (for example, an RRC signaling).

FIG. 9 is a diagram illustrating an example of an information element that transmits information on whether cross-carrier scheduling is configured according to an embodiment of the present disclosure.

A cross-carrier scheduling configuration (CrossCarrierSchedulingConfig) information element may be used to define the configuration when the cross-carrier scheduling is used in a predetermined cell (The IE CrossCarrierSchedulingConfig is used to specify the configuration when the cross-carrier scheduling is used in a cell).

Each field included in the information element of FIG. 9 may execute the function disclosed in Table 1.

TABLE 1

CrossCarrierSchedulingConfig field descriptions cif-Presence

The field is used to indicate whether carrier indicator field is present (value TRUE) or not (value FALSE) in PDCCH/EPDCCH DCI formats, see TS 36.212 [22, 5.3.3.1].

pdsch-Start

The starting OFDM symbol of PDSCH for the concerned SCell, see TS 36.213 [23.7.1.6.4]. Values 1, 2, 3 are applicable when di-Bandwidth for the concerned SCell is greater than 10 resource blocks, values 2, 3, 4 are applicable when di-Bandwidth for the concerned SCell is less than or equal to 10 resource blocks, see TS 36.211 [21, Table 6, 7-1]

schedulingCellId

Indicates which cell signals the downlink allocations and uplink grants, if applicable, for the concerned SCell.

As described above, when cross-carrier scheduling is configured in a serving cell, information on a scheduling cell may be configured and transmitted. The information on a scheduling cell may transmit information on DL allocations and UL grants control information of the corresponding serving cell.

For ease of description, in the present specifications, a serving cell or a component carrier to which cross-carrier scheduling is configured is referred to as a scheduled cell, and a serving cell through which PDSCH or PUSCH resource allocation control information of the corresponding scheduled cell is transmitted is referred to as a scheduling cell.

Also, in the present specifications, a scheduling cell may indicate a primary cell (PCell), and a scheduled cell may indicate a secondary cell (SCell). That is, PDSCH or PUSCH resource allocation control information of an SCell may be transmitted on a PCell.

Hereinafter, in the case of an FDD type DCI format, an information field that forms a DCI format is based on the information field defined for an FDD system, and in the case of a TDD type DCI format, with respect to an identical DCI format, an information field that forms the corresponding DCI format is based on the information field defined for a TDD system.

That is, for example, although an identical DCI format 1A is used, when an information field for allocating a HARQ process number is configured, it is formed of 3 bits in the case of the FDD system, and it is formed of 4 bits in the case of the TDD system. Also, the information field such as a Downlink Assignment Index (DAI) formed of two bits may exist in only the case of the TDD. Furthermore, although an identical DCI format is used, the type of an information field or the size of an information field may be different when an information field is configured. Therefore, for ease of description, in the present disclosure, although DCI format 1A is equally used, the DCI format 1A formed of information fields that may be applied to the FDD system may be referred to as FDD type DCI format 1A. In the same manner, the DCI format 1A formed of information fields that may be applied to the TDD system may be referred to as TDD type DCI formation 1A. Additionally, other DCI formats may also be specified by being distinguished into a TDD type DCI format and an FDD type DCI format.

Typically, when only the CA between serving cells that use an identical frame structure is allowed, the FDD type DCI format is used for data channel scheduling in the FDD serving cells and the TDD type DCI formation is used for data channel scheduling in the TDD serving cells, irrespective of whether cross-carrier scheduling is configured.

However, in the case in which the CA between TDD and FDD serving cells or component carriers is applied according to embodiments of the present disclosure, when cross-carrier scheduling between serving cells or component carriers that support different frame structures is applied, a DCI format to be used may need to be defined. That is, there is a drawback in that defining whether the FDD type DCI format or the TDD type DCI format is to be used is ambiguous.

Therefore, in accordance with at least one embodiment of the present disclosure, a method and apparatus may be provided for setting a type of DCI format to be used for transmitting scheduling information when cross-carrier scheduling among a plurality of serving cells or component carriers having different duplex mode is supported.

A scheduling cell described in each embodiment provided below may indicate a PCell, and a scheduled cell may indicate an SCell. Also, the part that is expressed as a serving cell may indicate a component carrier as described above.

First Embodiment: Using a DCI Format Based on a Frame Structure of a Scheduling Cell This is a method of configuring a DCI format based on the frame structure of a scheduling cell or a PCell through which the DCI associated with a corresponding scheduled cell is transmitted, irrespective of the frame structure of the scheduled cell to which cross-carrier scheduling is configured.

As an example, when resource allocation control information (DL assignment DCI or UL grant DCI) associated with a data channel (a PDSCH or a PSCH) of an FDD serving cell is transmitted through a TDD serving cell, although it is the transmission of the scheduling control information associated with the corresponding FDD serving cell, it is defined to use a TDD type DCI format.

As another example, when resource allocation control information (DL assignment DCI or UL grant DCI) associated with a data channel (a PDSCH or a PSCH) of a TDD serving cell is transmitted through an FDD serving cell, although it is the transmission of the scheduling control information associated with the corresponding TDD serving cell, it is defined to use an FDD type DCI format.

Hereinafter, the first embodiment will be described with reference to the drawing.

Figure 10:
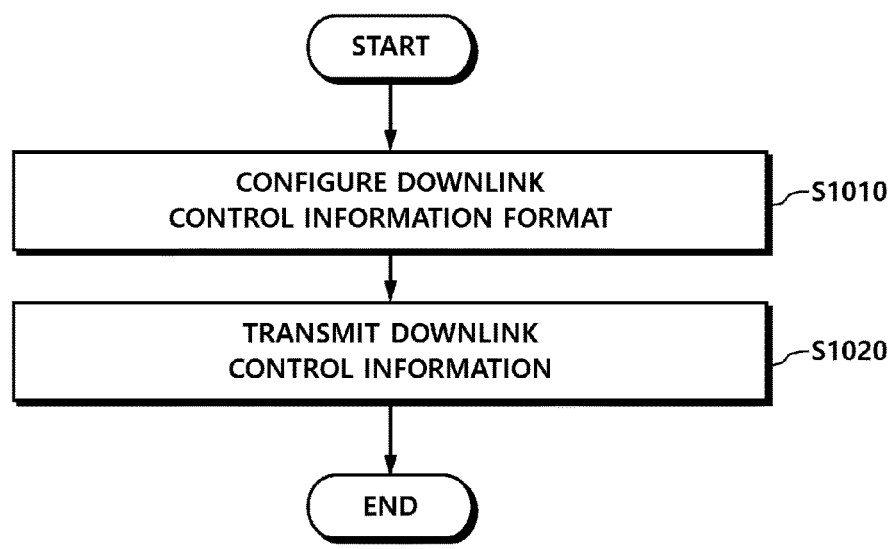
FIG. 10 is a flowchart illustrating the operations of a Base Station (BS) according to at least one embodiment.

FIG. 10 is a flowchart illustrating the operations of a BS according to an embodiment of the present disclosure.

A method for a BS to transmit downlink control information according to an embodiment of the present disclosure, may include configuring a downlink control information format based on a duplex mode of one of a plurality of cells configured for a UE that executes CA and transmitting downlink control information using the downlink control information format.

Referring to FIG. 10, the method of the BS of the present disclosure includes configuring a downlink control information format to transmit downlink control information to the UE that executes CA in operation S1010. As described above, the UE may configure CA with a plurality of cells having different duplex modes and may execute cross-carrier scheduling. In this instance, when the BS transmits the downlink control information for a scheduled cell, the BS may configure the downlink control information format based on the duplex mode of a PCell or a scheduling cell.

For example, in the situation where the UE is configured with a PCell that operates in the FDD mode and an SCell that operates in the TDD mode, the scheduling control information for the SCell may be transmitted through the PCell. In this instance, the BS may execute transmission by configuring the scheduling control information for the SCell in the downlink control information format of an FDD serving cell which is the PCell. That is, the downlink control information format may be configured to be different based on the duplex mode of the Primary Cell (PCell) of the UE that executes CA. Therefore, the downlink control information for a TDD SCell may be transmitted by being configured in an FDD type DCI format. In the same manner, when the TDD is a PCell, the downlink control information format for an FDD SCell may be transmitted by being configured in a TDD type DCI format.

As another example, the downlink control information format for a scheduled cell (or an SCell) may be determined based on the duplex mode of a Scheduling cell (or a PCell) even when the operation is executed in association with the CA performed by a UE.

The method of the BS includes transmitting, to the UE, downlink control information using the downlink control information format determined based on the duplex mode of the PCell in operation S1020.

In this instance, as described above, the downlink control information format that the BS transmits may be determined based on the duplex mode of the Primary Cell (PCell). Particularly, when the PCell is an FDD, the downlink control information format for a TDD SCell (or a TDD scheduled cell) may also be configured as an FDD type DCI format and does not include a Downlink Assignment Index (DAI). An information field indicating a HARQ process number is formed of three bits.

In the same manner, when the PCell is a TDD, the downlink control information format for an FDD S cell (or an FDD scheduled cell) may also be configured as a TDD type DCI format and may include a DAI of 2 bits. An information field indicating a HARQ process number may be formed of four bits.

As described above, the BS of the present embodiment may transmit downlink control information by configuring an information field of a downlink control information format associated with a scheduled cell based on the duplex mode of a PCell. Through the above, the ambiguity of the downlink control information format under the CA or dual connectivity may be overcome.

The operations of a UE according to the first embodiment will be described with reference to FIG. 11.

Figure 11:
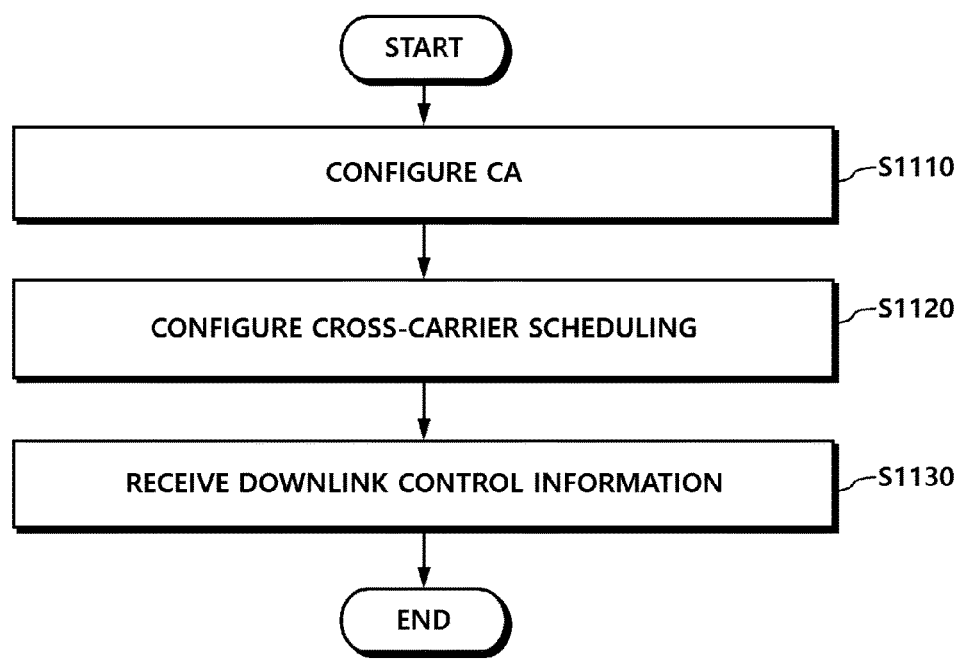
FIG. 11 is a flowchart illustrating the operations of a UE according to at least one embodiment.

FIG. 11 is a flowchart illustrating the operations of a UE according to an embodiment of the present disclosure.

A method for a UE to receive downlink control information according to an embodiment of the present disclosure includes configuring CA using a plurality of cells that have different duplex modes, configuring cross-carrier scheduling among the plurality of cells, and receiving downlink control information through a downlink control information format configured based on the duplex mode of one of the plurality of cells.

Referring to FIG. 11, the UE of the present embodiment configures CA using a plurality of cells having different duplex modes in operation S1110. In the same manner, the UE may configure dual connectivity with a plurality of BSs using the plurality of cells having different duplex modes.

The UE configures cross-carrier scheduling among a plurality of cells that configure CA or dual connectivity in operation S1120. As described above, cross-carrier scheduling indicates that a scheduling cell executes scheduling with respect to a scheduled cell. Also, this indicates that a PCell executes scheduling with respect to an SCell.

Subsequently, the UE receives, from the BS, downlink control information through a downlink control information format configured based on the duplex mode of one of the plurality of cells in operation S1130. For example, the UE may receive the downlink control information through the downlink control information format that is configured to be different based on the duplex mode of a serving cell, which is set as the PCell from among the plurality of cells.

Particularly, when the duplex mode of the PCell is an FDD, the UE may receive the downlink control information associated with a TDD SCell through an FDD type DCI format. That is, when the duplex mode of the PCell is an FDD, the downlink control information format does not include a Downlink Assignment Index (DAI) and an information field indicating a HARQ process number may be formed of three bits. As another example, when the duplex mode of the PCell is a TDD, the downlink control information format may include the DAI of two bits and an information field indicating a HARQ process number may be formed of four bits.

Accordingly, when the DCI format is configured according to the first embodiment, the BS may configure the downlink control information format for an SCell or a scheduled cell based on the duplex mode of a PCell.

Second Embodiment: Using DCI Format Based on a Frame Structure of a Scheduled Cell This is a method of defining to determine a DCI format type of a scheduling cell based on the frame structure of a scheduled cell to which cross-carrier scheduling is configured, which is different from the first embodiment. As an example, although cross-carrier scheduling is configured with respect to an FDD serving cell and resource allocation control information (DL assignment DCI or UL grant DCI) associated with a data channel (a PDSCH or a PUSCH) of the corresponding FDD serving cell is transmitted through a TDD serving cell, the scheduling control information for the FDD serving cell may be defined to use an FDD type DCI format.

As another example, when cross-carrier scheduling is configured with respect to a TDD serving cell and resource allocation control information (DL assignment DCI or UL grant DCI) associated with a data channel (a PDSCH or a PUSCH) of the corresponding TDD serving cell is transmitted through an FDD serving cell, the scheduling control information for the TDD serving cell may be defined to use a TDD type DCI format.

Third Embodiment: Definition of Prioritized DCI Format Type

The third embodiment defines the priority of a DCI format type. The third embodiment may define, based on the priority, a DCI format type to be used according to the frame structures of a scheduling cell and a scheduled cell. As an example, it is defined to prioritize an FDD type DCI format.

In this instance, when cross-carrier scheduling is configured with respect to an FDD serving cell and resource allocation control information (DL assignment DCI or UL grant DCI) associated with a data channel (a PDSCH or a PUSCH) of the corresponding FDD serving cell is transmitted through a TDD serving cell, the scheduling control information for the FDD serving cell may be defined to use an FDD type DCI format.

In addition, although cross-carrier scheduling is configured with respect to a TDD serving cell and resource allocation control information (DL assignment DCI or UL grant DCI) associated with a data channel (a PDSCH or a PUSCH) of the corresponding TDD serving cell is transmitted through an FDD serving cell, the scheduling control information for the TDD serving cell may be defined to use an FDD type DCI format.

As another example, it is defined to prioritize a TDD type DCI format.

In this instance, when cross-carrier scheduling is configured with respect to an FDD serving cell and resource allocation control information (DL assignment DCI or UL grant DCI) associated with a data channel (a PDSCH or a PUSCH) of the corresponding FDD serving cell is transmitted through a TDD serving cell, the scheduling control information for the FDD serving cell may be defined to use a TDD type DCI format.

In addition, although cross-carrier scheduling is configured with respect to a TDD serving cell and resource allocation control information (DL assignment DCI or UL grant DCI) associated with a data channel (a PDSCH or a PUSCH) of the corresponding TDD serving cell is transmitted through an FDD serving cell, the scheduling control information for the TDD serving cell may be defined to use a TDD type DCI format.

Fourth Embodiment: Configuring DCI Format Type Through RRC Signaling

As another method of defining a DCI format type to be used when cross-carrier is configured under the CA between an FDD serving cell and a TDD serving cell, a method may be defined to configure a DCI format type to be used together and to signal the same to a UE when the corresponding cross-carrier scheduling is configured.

FIG. 12 is a diagram illustrating an example of an information element that designates a DCI format according to another embodiment of the present disclosure.

That is, it is defined to define a DCI format type configuration parameter in an RRC signaling to be used for configuring the described cross-carrier scheduling, and to include the same in the RRC signaling, as illustrated in FIG. 12. The RRC signaling is described as an example of a higher layer signaling, and the corresponding configuration information may be transmitted through another higher layer signaling.

Referring to FIG. 12, a DCIformatType information element may be added to cross-carrier scheduling configuration information. The DCIformatType information element may include information indicating an FDD type or a TDD type. That is, based on whether an RRC parameter that is defined as DCIformatType is configured, a DCI format type that is used for a corresponding scheduling cell to allocate a PDSCH or PUSCH resource of a corresponding scheduled cell, may be configured and transmitted.

Figure 13:
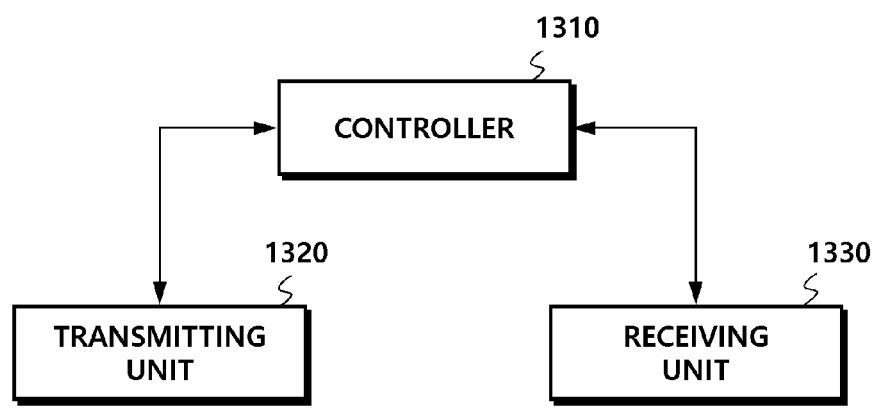
FIG. 13 is a diagram illustrating a configuration of a BS according to at least one embodiment.

FIG. 13 is a diagram illustrating a configuration of a BS according to an embodiment of the present disclosure.

Referring to FIG. 13, a BS 1300 according to an embodiment of the present disclosure includes a controller 1310, a transmitting unit 1320, and a receiving unit 1330.

A BS 1300 to transmit downlink control information according to an embodiment of the present disclosure, may include a controller 1310 that configures a downlink control information format based on a duplex mode of one of a plurality of cells configured for a UE that executes CA, and a transmitting unit 1320 that transmits downlink control information using the downlink control information format.

The UE that receives the downlink control information may configure CA with a plurality of cells having different duplex modes and may execute cross-carrier scheduling.

The controller 1310 controls the general operations of the BS in association with defining a DCI format to be used for transmitting downlink control information, which is required to implement the present embodiment. Therefore, the controller 1310 may configure the downlink control information format to be different based on the duplex mode of a Primary Cell (PCell) of the UE that executes CA.

As an example, when the duplex mode of the PCell is an FDD, the controller 1310 may configure the downlink control information format which does not include a Downlink Assignment Index (DAD, and of which an information field indicating a HARQ process number is formed of three bits.

As another example, when the duplex mode of the PCell is a TDD, the controller 1310 configures the downlink control information format which includes the DAI of two bits, and of which an information field indicating a HARQ process number is formed of four bits.

Also, the transmitting unit 1320 may transmit the downlink control information using the downlink control information format configured as described above method.

In addition, the transmitting unit 1320 and the receiving unit 1330 may be used for transmitting and receiving, to/from a terminal, a signal or a message and data required for implementing the above described present invention.

The controller 1310 may execute the operations required to implement the operations of the above described second to the fourth embodiments.

Figure 14:
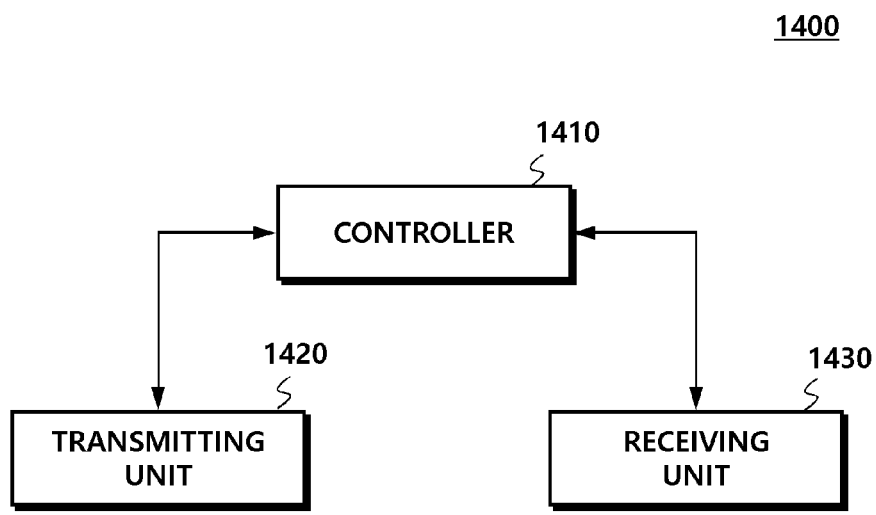
FIG. 14 is a diagram illustrating a configuration of a UE according to at least one embodiment.

FIG. 14 is a diagram illustrating a configuration of a UE according to an embodiment of the present disclosure.

Referring to FIG. 14, a UE 1400 according to an embodiment of the present disclosure includes a receiving unit 1430, a controller 1410, and a transmitting unit 1420.

A UE 1400 according to an embodiment of the present disclosure includes a controller 1410 that configures CA using a plurality of cells having different duplex modes and configures cross-carrier scheduling among the plurality of cells, and a receiving unit 1430 that receives downlink control information through a downlink control information format configured based on the duplex mode of one of the plurality of cells.

The controller 1410 may configure CA or dual connectivity using a plurality of cells and may execute cross-carrier scheduling.

Also, the receiving unit 1430 may receive, from a BS, downlink control information configured based on the duplex mode of one of a plurality of cells, and additionally may receive data and messages through a corresponding channel.

The downlink control information format that the UE receives may be configured to be different based on the duplex mode of a PCell.

As an example, when the duplex mode of the PCell is an FDD, the downlink control information format does not include a Downlink Assignment Index (DAI), and an information field indicating a HARQ process number may be formed of three bits.

As another example, when the duplex mode of the PCell is a TDD, the downlink control information format may include the DAI of two bits, and an information field indicating a HARQ process number may be formed of four bits.

Also, the controller 1410 may execute all the operations required to implement the above described embodiments of the present disclosure.

The transmitting unit 1420 transmits, to the BS, uplink control information, data, and a message, through a corresponding channel.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method for a Base Station (BS) to transmit control information, the method comprising:

configuring a downlink control information (DCI) format based on a duplex mode of one of a plurality of cells configured for a User Equipment (UE) that executes Carrier Aggregation (CA) and cross-carrier scheduling; and transmitting downlink control information using the DCI format, wherein in a case that the plurality of cells include a primary cell (PCell) and at least one secondary cell (SCell) which have different duplex modes, the downlink control information for the at least one SCell is transmitted through the PCell, and the DCI format used to transmit the downlink control information for the at least one SCell is configured based on a duplex mode of the PCell; and wherein:

(i) if the PCell operates in a time division duplex (TDD) mode and the at least one SCell operates in a frequency division duplex (FDD) mode, the DCI format of the downlink control information for the at least one SCell to be transmitted through the PCell using the cross-carrier scheduling is configured as a TDD type DCI format applied to the TDD mode of the PCell, wherein the configured DCI format includes a Downlink Assignment Index (DAI) field of two bits and an HARQ process number field of four bits; and (ii) if the PCell operates in the FDD mode and the at least one SCell operates in the TDD mode, the DCI format of the downlink control information for the at least one SCell to be transmitted through the PCell using the cross-carrier scheduling is configured as an FDD type DCI format applied to the FDD mode of the PCell, wherein the configured DCI format does not include a DAI field and includes an HARQ process number field of three bits, and wherein the UE is configured with the CA with the plurality of cells having the different duplex modes by the BS and executes the cross-carrier scheduling.

2. A method for a User Equipment (UE) to receive downlink control information, the method comprising:

configuring, by the UE, Carrier Aggregation (CA) using a plurality of cells which have different duplex modes;

configuring, by the UE, cross-carrier scheduling among the plurality of cells; and receiving downlink control information (DCI) through a DCI format configured based on a duplex mode of one of the plurality of cells, wherein in a case that the plurality of cells include a primary cell (PCell) and at least one secondary cell (SCell) which have the different duplex modes, the downlink control information for the at least one SCell is received through the PCell, and the DCI format used to receive the downlink control information for the at least one SCell is configured based on-a duplex mode of the PCell; and wherein:

(i) if the PCell operates in a time division duplex (TDD) mode and the at least one SCell operates in a frequency division duplex (FDD) mode, the DCI format of the downlink control information for the at least one SCell to be received through the PCell using the cross-carrier scheduling is configured as a TDD type DCI format applied to the TDD mode of the PCell, wherein the configured DCI format includes a Downlink Assignment Index (DAI) field of two bits and an HARQ process number field of four bits; and (ii) if the PCell operates in the FDD mode and the at least one SCell operates in the TDD mode, the DCI format of the downlink control information for the at least one SCell to be received through the PCell using the cross-carrier scheduling is configured as an FDD type DCI format applied to the FDD mode of the PCell, wherein the configured DCI format does not include a DAI field and includes an HARQ process number field of three bits wherein the UE is configured with the CA with the plurality of cells having the different duplex modes by the BS and executes the cross-carrier scheduling.

3. A User Equipment (UE) that receives downlink control information, the UE comprising:

a controller configured to configure Carrier Aggregation (CA) using a plurality of cells which have different duplex modes, and configure cross-carrier scheduling among the plurality of cells; and a receiving unit configured to receive downlink control information (DCI) through a DCI format configured based on a duplex mode of one of the plurality of cells, wherein in a case that the plurality of cells include a primary cell (PCell) and at least one secondary cell (SCell) which have the different duplex modes, the downlink control information for the at least one SCell is received through the PCell, and the DCI format used to receive the downlink control information for the at least one SCell is configured based on a duplex mode of the PCell; and wherein:

(i) if the PCell operates in a time division duplex (TDD) mode and the at least one SCell operates in a frequency division duplex (FDD) mode, the DCI format of the downlink control information for the at least one SCell to be received through the PCell using the cross-carrier scheduling is configured as a TDD type DCI format applied to the TDD mode of the PCell, wherein the configured DCI format includes a Downlink Assignment Index (DAI) field of two bits and an HARQ process number field of four bits; and (ii) if the PCell operates in the FDD mode and the at least one SCell operates in the TDD mode, the DCI format of the downlink control information for the at least one SCell to be received through the PCell using the cross-carrier scheduling is configured as an FDD type DCI format applied to the FDD mode of the PCell, wherein the configured DCI format does not include a DAI field and includes an HARQ process number field of three bits.

* * * * *